Oct. 19, 1971  R. L. GOWER  3,613,355

CONNECTOR DEVICES

Filed June 30, 1969

INVENTOR.
ROGER L. GOWER
BY

ATTORNEY

United States Patent Office 3,613,355
Patented Oct. 19, 1971

3,613,355
CONNECTOR DEVICES
Roger L. Gower, 21 Coburn Ave., Skowhegan, Maine
Filed June 30, 1969, Ser. No. 837,521
Int. Cl. F16g *15/00*
U.S. Cl. 59—93                                 2 Claims

ABSTRACT OF THE DISCLOSURE

This disclosure relates to connector devices for chain and cable assemblies, combining ease of assembly and disassembly with minimal possibility of accidental disassembly.

This invention is a part of the family of connector devices having, integrally formed, a base member at one end and hook means at the opposite end, with a shank member connecting the two ends. It is an improvement over the "Cobra-Hook" disclosed in my Patent No. 3,424,-219, said latter device having a shank with a hook at one end flared and flattened in a configuration resembling the head of a cobra, and at the opposite end a plate lying in a plane transverse to the longitudinal axis of the shank. The connector of that invention contemplates fabrication by forging or casting.

The present invention uses in its fabrication a length of wire or bar stock, which is bent at one end into a circular or spiral configuration exceeding 360 degrees, said circle of such bar stock being disposed in a plane perpendicular to the shank connecting said circle to the formed hook member at the opposite end.

Upon the outermost surface of the bar stock at the end of the hook member, a portion of the bar stock is flattened, to permit insertion of the hook into and through a link as of chain, and removal therefrom, upon proper manipulation of the connector device and the link.

In the accompanying drawings.

Referring more particularly to the drawings—

Figure 1:
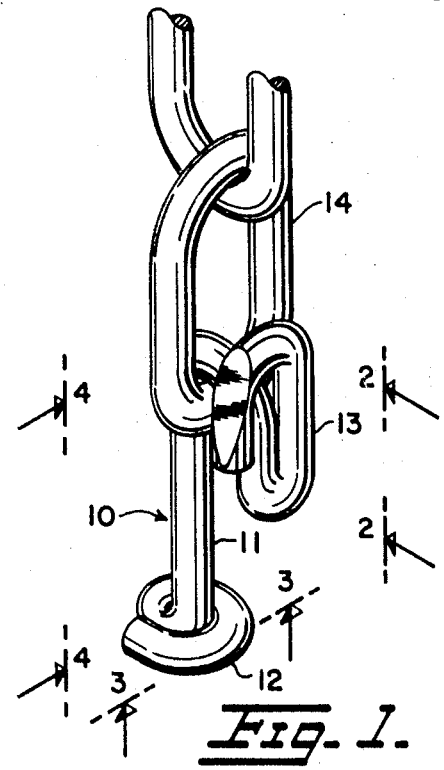
FIG. 1 is a perspective view of the device with the hook inserted through a link of chain.

In FIG. 1, connector device 10 having shank 11, base member 12 and hook 13 is shown with said hook 13 inserted through link 14.

Figure 2:
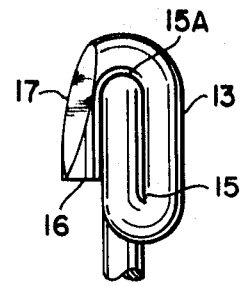
FIG. 2 is a top plan view of the hook member, taken on line 2—2 of FIG. 1.

FIG. 2 shows the hook member 13 formed by the bar stock, said stock being turned upon itself at points 15 and 15A, and terminating at 16, with area 17 slightly flattened to facilitate passage of said hook through the link of chain.

Figure 3:
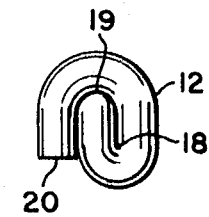
FIG. 3 is an end view of the device showing the configuration of the base portion thereof, taken on line 3—3 of FIG. 1.

FIG. 3 shows the base member 12 likewise formed by having the bar stock turned upon itself at 18 and 19, and terminating at 20.

Figure 4:
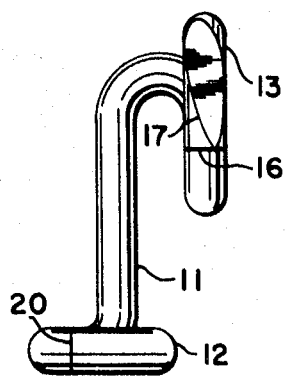
FIG. 4 is a side view of the device, taken on line 4—4 of FIG. 1.

FIG. 4 shows the device in side view, indicating the termini of base member 12 at 20, and of hook member 13 at 16.

Figure 5:
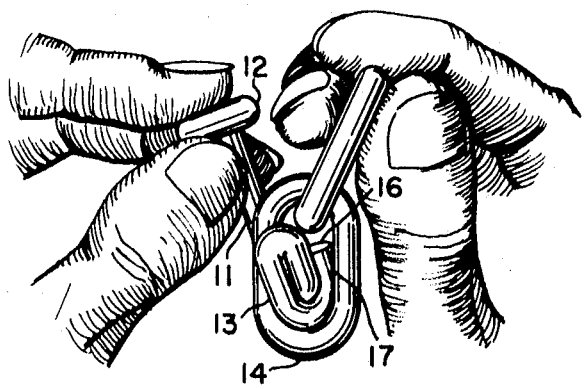
FIG. 5 shows the relative positions of the connector device and the link of chain when assembly is to be effected.

In FIG. 5 the method of assembly is shown, wherein the connector device is disposed with the base member drawn back toward the length of chain at the end of which the device is to be connected, with hook 13 having its major axis substantially parallel with the major axis of the link through which it is to be inserted. The purpose of the flattened area 17 becomes apparent as the connector device is turned to draw the hook through the link, with said flattened area passing in substantial contiguity with the link along one side of the interior thereof.

Figure 6:
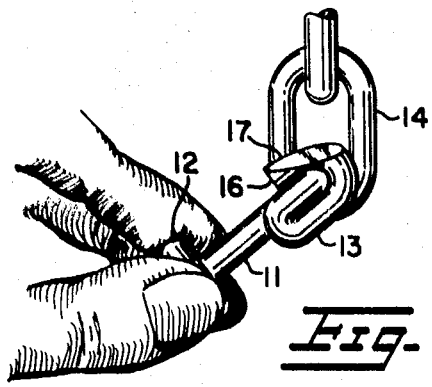
FIG. 6 shows the relative positions of the connector device and the link of chain through which said device has been inserted.

As the said flattened area passes the side of the link, the connector device is turned, as shown in FIG. 6, so that the base member is drawn away from the chain links and said turning is continued to bring the axis of the shank of the connector device into continuance of the axis of the chain links.

Disassembly is effected by reversing the process herein described, and it will be clear that accidental disassembly of the device in service is minimally possible because the connector and the chain are seldom, if ever, jostled into such relative positions as to permit passage of the hook through the chain link by such accidental maneuver.

While the structure described herein and shown in the drawings has a hook at one end and a base member at the opposite end, it may be found desirable to provide like hook members at both ends of the device, to serve as a linear connector as, for example, in joining two lengths of chain.

It will be seen that the proper manipulation required to assemble the connector device into a link of chain consists of placing the connector so that one side of the hook plate is beneath the link, with the longitudinal axes of the hook and the link disposed in parallel relationship. The hook is then lifted through the link, with the hook being turned slightly to permit the outermost, flattened, surface to pass in close proximity to the inside of the link upon one of the long sides thereof. Thereafter, the connector is turned to place the base portion at the furthermost point from the link of the chain, with the shank of the connector in longitudinal continuation of the major axis of the link of chain.

It is to be understood that the form of the invention herein shown and described is to be taken as a preferred example of the same, and that various changes may be made within the scope of the subjoined claims.

What is claimed is:

1. A connector device fabricated from bar stock and having at one end thereof a transverse plate-like arcuately formed configuration and at the opposite end thereof a hook member formed by bending said bar stock, the said hook having a head formed by continuing sequential turns of said bar stock, said plate-like member and said hook being integrally connected by a shank, wherein the head of said hook member is formed by more than one turn of said bar stock in a substantially elliptical figure, said bar stock being turned upon itself in a plane for a distance of 350 degrees, and wherein one side of the bar stock of said hook member may have an area of reduced diameter substantially flattened in a direction substantially parallel with the major axis of said head, and wherein the end of said bar stock forming said head extends a distance less than the full length of the said head.

2. The invention of claim 1, wherein said plate-like configuration is formed by turning the bar stock arcuately for at least 360 degrees and continuing tangentially from said arc.

References Cited

UNITED STATES PATENTS

| | | | |
|---|---|---|---|
| 1,298,051 | 3/1919 | Keator | 59—93 |
| 1,421,442 | 7/1922 | Flynn | 59—93 |
| 1,426,877 | 8/1922 | King | 59—85 |
| 1,583,029 | 5/1926 | Thomas | 59—85 |
| 2,016,756 | 10/1935 | Taylor | 59—93 |
| 3,424,219 | 1/1969 | Gower | 59—93 |
| 3,495,400 | 2/1970 | Gower | 59—93 |
| 3,511,527 | 5/1970 | Gower | 59—93 |

CHARLES W. LANHAM, Primary Examiner

G. P. CROSBY, Assistant Examiner

U.S. Cl. X.R.

24—116 R; 152—244